No. 772,612. Patented October 18, 1904.

UNITED STATES PATENT OFFICE.

WILLIAM T. GIBBS, OF BUCKINGHAM, CANADA.

METHOD OF DECOMPOSING REFRACTORY SILICATES.

SPECIFICATION forming part of Letters Patent No. 772,612, dated October 18, 1904.

Application filed October 30, 1903. Serial No. 179,178. (No specimens.)

*To all whom it may concern:*

Be it known that I, WILLIAM T. GIBBS, a subject of the King of Great Britain and Canada, residing at Buckingham, Province of Quebec, county of Ottawa, Canada, have invented certain new and useful Improvements in Methods of Decomposing Refractory Silicates, described in the following specification.

This invention relates to a new method of decomposing or breaking up refractory silicates—such, for instance, as the feldspars, potash mica, and the like—the especial object of the invention being to provide a simple and commercial method of treating such silicates for the recovery of the potash and alumina or other valuable constituents. I have discovered what may be called a "catalytic" process of treating such silicates by which a small proportion of a catalytic agent in solution with a reagent that will combine with the base or bases of the silicates and leave the catalytic agent free for further action is employed, so that the decomposition or breaking up of the silicate continues by self-regeneration or automatic re-formation of the catalytic agent as long as any of the silicate under treatment remains unattacked. The catalytic agent that I have found best suited to the work is a compound containing fluorin, and I preferably employ hydrofluosilicic acid or its equivalent. Any suitable reagent may be employed that will secure the result desired of combining with the base or bases of the silicate under treatment, so as to continuously regenerate or set free the catalytic agent. I have secured excellent results with sulfuric acid, however, and prefer this reagent. These acids may be used in different proportions; but only a small proportion of hydrofluosilicic acid is required, with a comparatively large proportion of sulfuric acid, and I have secured excellent results with a solution containing from two to four per cent. of hydrofluosilicic acid and fifty per cent. or more of sulfuric acid.

In carrying out my process the silicates are pulverized, so as to be treated in a finely-divided state, and then heated with the decomposing solution in any suitable refractory vessel to the boiling-point of the acids and are then kept at this heat until all the silicate under treatment is decomposed. The separated silica remains in suspension in the solution and is then filtered out. The potash and alumina crystallize on cooling as potash alum, and when desired this potash alum may be separated into potash and alumina by any suitable method.

By my method a practically unlimited quantity of feldspar or other refractory silicate can be decomposed by the action of a very limited quantity of hydrofluosilicic acid or its equivalent in the presence of a sufficient supply of sulfuric acid or other suitable reagent that will keep the hydrofluosilicic acid free from the bases, so as to yield potash alum and free silica.

What I claim is—

1. The method of decomposing refractory silicates, which consists in treating the silicate with a decomposing solution containing a catalytic agent and a reagent that will combine with the base or bases and leave the catalytic agent free for further action.

2. The method of decomposing refractory silicates which consists in treating the silicate with a decomposing solution containing a compound of fluorin and a reagent that will combine with the base or bases and leave the fluorin compound free for further action.

3. The method of decomposing refractory silicates which consists in treating the silicate with a decomposing solution containing hydrofluosilicic acid and a reagent that will combine with the base or bases and leave the hydrofluosilicic acid free for further action.

4. The method of decomposing refractory silicates which consists in treating the silicate with a decomposing solution containing sulfuric acid and a catalytic agent consisting of a compound of fluorin.

5. The method of decomposing refractory silicates which consists in treating the silicate with a decomposing solution containing a small proportion of a compound of fluorin and a large proportion of sulfuric acid, substantially as described.

6. The method of decomposing refractory silicates which consists in treating the silicate with a decomposing solution containing hydrofluosilicic acid and sulfuric acid.

7. The method of decomposing refractory silicates which consists in treating the silicate with a decomposing solution containing a small proportion of hydrofluosilicic acid and a large proportion of sulfuric acid, substantially as described.

In testimony whereof I have hereunto set my hand in the presence of two subscribing witnesses.

W. T. GIBBS.

Witnesses:
  C. J. SAWYER,
  W. H. KENNEDY.